(12) United States Patent
Hsieh

(10) Patent No.: US 10,511,764 B2
(45) Date of Patent: Dec. 17, 2019

(54) IMAGE ANALYZING METHOD AND CAMERA

(71) Applicant: VIVOTEK INC., New Taipei (TW)

(72) Inventor: Kuo-Yeh Hsieh, New Taipei (TW)

(73) Assignee: VIVOTEK INC., New Taipei (TW)

( * ) Notice: Subject to any disclaimer, the term of this patent is extended or adjusted under 35 U.S.C. 154(b) by 0 days.

(21) Appl. No.: 15/841,305

(22) Filed: Dec. 14, 2017

(65) Prior Publication Data
US 2018/0176464 A1 Jun. 21, 2018

(30) Foreign Application Priority Data

Dec. 15, 2016 (TW) .............................. 105141532 A

(51) Int. Cl.
H04N 5/232 (2006.01)
H04N 7/18 (2006.01)
(52) U.S. Cl.
CPC ..... *H04N 5/23222* (2013.01); *H04N 5/23229* (2013.01); *H04N 5/23296* (2013.01); *H04N 7/183* (2013.01)
(58) Field of Classification Search
None
See application file for complete search history.

(56) References Cited

U.S. PATENT DOCUMENTS

| 6,546,115 B1* | 4/2003 | Ito ................... G08B 13/19602 348/169 |
| 8,854,469 B2* | 10/2014 | Horbinger ............... G06T 7/254 348/159 |
| 9,592,912 B1* | 3/2017 | Michini ................. G01C 15/02 |
| 9,746,988 B2* | 8/2017 | Kim .................. G08B 13/19671 |
| 9,756,248 B1* | 9/2017 | Wu ..................... H04N 5/23254 |
| 2002/0102991 A1* | 8/2002 | Sentz .................... H01Q 1/288 455/456.5 |
| 2003/0025599 A1* | 2/2003 | Monroe ........... G08B 13/19602 340/531 |

(Continued)

FOREIGN PATENT DOCUMENTS

CN 105915802 A 8/2016
TW I556651 B 11/2016

OTHER PUBLICATIONS

Choi et al., "CCTV Coverage Index Based on Surveillance Resolution and Its Evaluation Using 3D Spatial Analysis, Sensors, ISSN 1424-8220" (Year: 2015).*

(Continued)

*Primary Examiner* — Mohammad J Rahman
(74) *Attorney, Agent, or Firm* — Winston Hsu

(57) ABSTRACT

An image analyzing method is applied to a camera and the camera is configured to monitor a monitored area. The image analyzing method includes steps of driving the camera to monitor the monitored area; sampling a plurality of field of views when the camera monitors the monitored area, so as to obtain a plurality of time information and a plurality of position information corresponding to the field of views, wherein each of the time information is corresponding to one of the position information; recording the time information and the position information; and generating a monitoring strength distribution corresponding to the monitored area according to the time information and the position information.

16 Claims, 5 Drawing Sheets

(56) References Cited

U.S. PATENT DOCUMENTS

| | | | | |
|---|---|---|---|---|
| 2003/0105578 | A1* | 6/2003 | Takenaga | B60W 30/16 |
| | | | | 701/117 |
| 2005/0064926 | A1* | 3/2005 | Walker | G07F 17/32 |
| | | | | 463/16 |
| 2005/0069207 | A1* | 3/2005 | Zakrzewski | B64D 45/0015 |
| | | | | 382/190 |
| 2008/0018738 | A1* | 1/2008 | Lipton | G06K 9/00771 |
| | | | | 348/143 |
| 2008/0084482 | A1* | 4/2008 | Hansson | H04N 5/23232 |
| | | | | 348/218.1 |
| 2009/0193055 | A1* | 7/2009 | Kuberka | G06F 16/51 |
| 2010/0131533 | A1* | 5/2010 | Ortiz | G06F 16/58 |
| | | | | 707/758 |
| 2010/0201787 | A1* | 8/2010 | Zehavi | G01S 5/16 |
| | | | | 348/48 |
| 2012/0045090 | A1* | 2/2012 | Bobbitt | G06K 9/00771 |
| | | | | 382/103 |
| 2012/0166137 | A1* | 6/2012 | Grasser | G01C 15/00 |
| | | | | 702/150 |
| 2012/0294549 | A1* | 11/2012 | Doepke | G06T 3/4038 |
| | | | | 382/294 |
| 2013/0063550 | A1* | 3/2013 | Ritchey | G16H 40/63 |
| | | | | 348/36 |
| 2013/0163879 | A1* | 6/2013 | Katz | G06K 9/6202 |
| | | | | 382/195 |
| 2014/0161305 | A1* | 6/2014 | Lee | G06K 9/00362 |
| | | | | 382/103 |
| 2014/0269942 | A1* | 9/2014 | Mikov | H04N 19/172 |
| | | | | 375/240.27 |
| 2015/0268043 | A1* | 9/2015 | McFadden | G01C 11/04 |
| | | | | 702/159 |
| 2015/0276402 | A1* | 10/2015 | Grasser | G01C 15/06 |
| | | | | 702/150 |
| 2016/0021344 | A1* | 1/2016 | Renkis | H04N 7/181 |
| | | | | 348/48 |
| 2016/0127641 | A1* | 5/2016 | Gove | G06T 1/0007 |
| | | | | 348/143 |
| 2016/0259854 | A1* | 9/2016 | Liu | G06F 16/739 |
| 2016/0335484 | A1* | 11/2016 | Xie | G06K 9/00335 |
| 2017/0068851 | A1* | 3/2017 | Lee | G06K 9/00362 |
| 2017/0254876 | A1* | 9/2017 | Wulff | G06K 7/10366 |
| 2017/0264890 | A1* | 9/2017 | Gorilovsky | G03B 37/04 |
| 2017/0294096 | A1* | 10/2017 | Webb | G08B 21/0453 |
| 2018/0109767 | A1* | 4/2018 | Li | H04N 5/23206 |
| 2018/0155052 | A1* | 6/2018 | Lacroix | G08G 5/0013 |

OTHER PUBLICATIONS

Applying video sensor networks to nearshore environment monitoring: R.Holman, J. Stanley, T. Ozkan-Haller, Published in: IEEE Pervasive Computing (vol. 2, Issue:4, Oct.-Dec. 2003),pp. 14-21 , Date of Publication: Dec. 8, 2003.

* cited by examiner

IMAGE ANALYZING METHOD AND CAMERA

BACKGROUND OF THE INVENTION

1. Field of the Invention

The invention relates to an image analyzing method and a camera and, more particularly, to an image analyzing method and a camera capable of generating a monitoring strength distribution corresponding to a monitored area.

2. Description of the Prior Art

Since safety awareness is being raised gradually, people pay much attention to safety surveillance application. So far in many public or non-public places, there are always one or more cameras installed for safety surveillance. In general, a camera is configured to monitor a monitored area. A user can set a monitored path or select a plurality of regions of interest (ROI) in the monitored area, so as to monitor the monitored path or the regions of interest. When monitoring the monitored area, a dead spot may exist due to specific operation of the user, such that safety cannot be ensured at the dead spot.

SUMMARY OF THE INVENTION

An objective of the invention is to provide an image analyzing method and a camera capable of generating a monitoring strength distribution corresponding to a monitored area, so as to solve the aforesaid problems.

According to an embodiment of the invention, an image analyzing method is applied to a camera and the camera is configured to monitor a monitored area. The image analyzing method comprises steps of driving the camera to monitor the monitored area; sampling a plurality of field of views when the camera monitors the monitored area, so as to obtain a plurality of time information and a plurality of position information corresponding to the field of views, wherein each of the time information is corresponding to one of the position information; recording the time information and the position information; and generating a monitoring strength distribution corresponding to the monitored area according to the time information and the position information.

According to another embodiment of the invention, a camera is configured to monitor a monitored area. The camera comprises an image capturing module and a processor, wherein the processor is electrically connected to the image capturing module. The processor drives the image capturing module to monitor the monitored area. The processor samples a plurality of field of views when the image capturing module monitors the monitored area, so as to obtain a plurality of time information and a plurality of position information corresponding to the field of views, wherein each of the time information is corresponding to one of the position information. The processor records the time information and the position information. The processor generates a monitoring strength distribution corresponding to the monitored area according to the time information and the position information.

As mentioned in the above, when driving the image capturing module of the camera to monitor the monitored area, the invention samples a plurality of field of views to obtain a plurality of time information and a plurality of position information. Then, the invention generates the monitoring strength distribution corresponding to the monitored area according to the time information and the position information. A user can obtain information including coverage, hot zone, dead spot, and so on related to the monitored area through the monitoring strength distribution corresponding to the monitored area, so as to know well the monitored condition of the monitored area.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
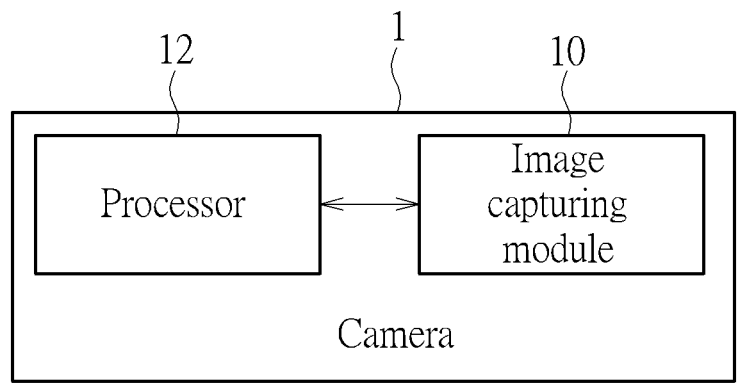
FIG. 1 is a functional block diagram illustrating a camera according to an embodiment of the invention.
Figure 2:
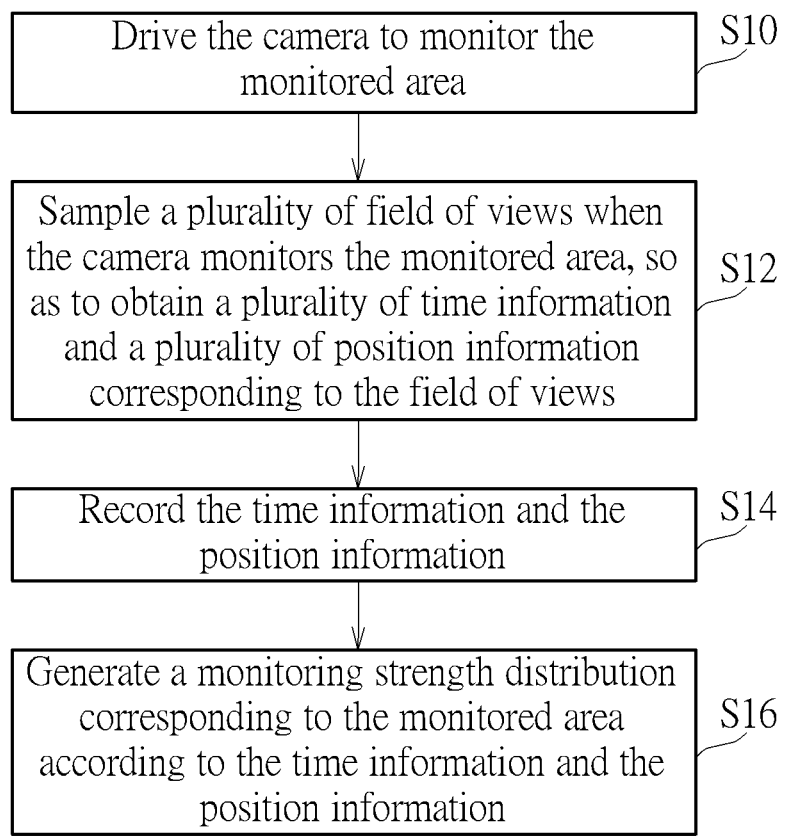
FIG. 2 is a flowchart illustrating an image analyzing method according to an embodiment of the invention.
Figure 3:
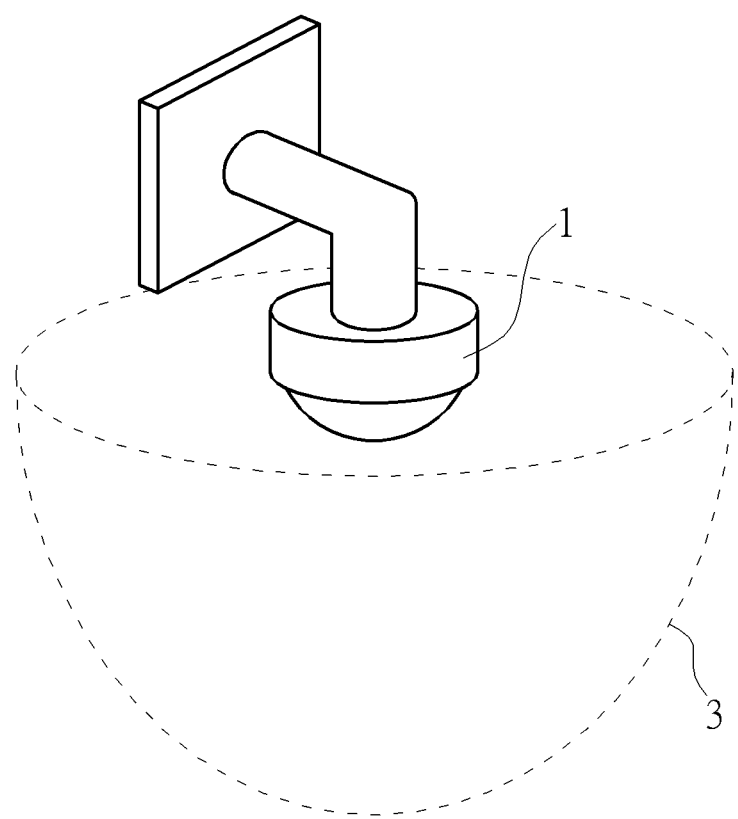
FIG. 3 is a schematic diagram illustrating the camera shown in FIG. 1 configured to monitor a monitored area.

Referring to FIGS. 1 to 3, FIG. 1 is a functional block diagram illustrating a camera 1 according to an embodiment of the invention, FIG. 2 is a flowchart illustrating an image analyzing method according to an embodiment of the invention, and FIG. 3 is a schematic diagram illustrating the camera 1 shown in FIG. 1 configured to monitor a monitored area 3. The image analyzing method shown in FIG. 2 is applied to the camera 1 shown in FIG. 1.

As shown in FIG. 3, the camera 1 of the invention is configured to monitor a monitored area 3. In this embodiment, the camera 1 may be, but not limited to, a fisheye camera or a pan-tilt-zoom (PTZ) camera. Furthermore, the monitored area 3 may cover a range with 360 degrees in horizontal direction and 90 degrees in vertical direction. It should be noted that the range of the monitored area 3 may be adjusted according to practical applications and it is not limited to the embodiment shown in FIG. 3.

As shown in FIG. 1, the camera 1 comprises an image capturing module 10 and a processor 12, wherein the processor 12 is electrically connected to the image capturing module 10. In practical applications, the image capturing module 10 may be a charge-coupled device (CCD) sensor or a complementary metal-oxide semiconductor (CMOS) sensor. In general, the camera 1 may be further equipped with some necessary hardware or software components for specific purposes, such as a memory, a circuit board, a power supply, applications, a communication module, a lens, etc., and it depends on practical applications. The processor 12 is configured to perform the image analyzing method of the invention, so as to generate a monitoring strength distribution corresponding to the monitored area 3. The image analyzing method of the invention is depicted in detail in the following.

First of all, the method of the invention drives the image capturing module 10 of the camera 1 to monitor the monitored area 3 (step S10 in FIG. 2). Then, the method of the invention samples a plurality of field of views when the image capturing module 10 of the camera 1 monitors the monitored area 3, so as to obtain a plurality of time information and a plurality of position information corresponding to the field of views (step S12 in FIG. 2), wherein each of the time information is corresponding to one of the position information. Then, the method of the invention records the time information and the position information (step S14 in FIG. 2). Then, the method of the invention generates a monitoring strength distribution corresponding to the monitored area 3 according to the time information and the position information (step S16 in FIG. 2).

In step S10, the invention may drive the camera 1 to monitor the monitored area 3 according to different operating modes, wherein the operating mode may be a patrol mode, an auto-tracking mode, a normal control mode, and so on.

In step S12, the sampling manner may be "polling sample" or "stable sample". Polling sample means that the method of the invention samples the field of views of the camera 1 with a first time interval, i.e. the method of the invention samples a current field of view of the camera 1 every the first time interval (e.g. 0.5 second). Stable sample means that the method of the invention samples a current field of view of the camera 1 when the current field of view is motionless.

In step S14, in addition to the time information and the position information, the method of the invention may further selectively record at least one of a sampling manner (e.g. polling sample or stable sample), an operating mode (e.g. patrol mode, auto-tracking mode or normal control mode) and an operating person (e.g. identification code of the operating person) corresponding to each of the field of view. As to the time information and the position information, they may be designed in various formats according to practical applications and the exemplary embodiments are depicted in detail in the following.

Embodiment 1

In embodiment 1, the time information may be a time stamp and the position information may be a grid coordinate. As shown in table 1 below, the monitored area 3 may be defined as 5×5 grids and a sampled field of view may comprise nine grids with corresponding grid coordinates (0,1), (1,1), (2,1), (0,2), (1,2), (2,2), (0,3), (1,3), (2,3), wherein the numeral "0" following the grid coordinate represents that the grid is not located within the field of view and the numeral "1" following the grid coordinate represents that the grid is located within the field of view. Accordingly, step S14 may record the information shown in table 2 below.

TABLE 1

| (0, 0):0 | (1, 0):0 | (2, 0):0 | (3, 0):0 | (4, 0):0 |
| (0, 1):1 | (1, 1):1 | (2, 1):1 | (3, 1):0 | (4, 1):0 |
| (0, 2):1 | (1, 2):1 | (2, 2):1 | (3, 2):0 | (4, 2):0 |
| (0, 3):1 | (1, 3):1 | (2, 3):1 | (3, 3):0 | (4, 3):0 |
| (0, 4):0 | (1, 4):0 | (2, 4):0 | (3, 4):0 | (4, 4):0 |

TABLE 2

| Time stamp | Grid coordinate | Sampling manner | Operating mode | Operating person |
| --- | --- | --- | --- | --- |
| Oct. 25, 2016 13:15:20 | 00000111001 11001110000 000 | 0 (Polling sample) | 0 (Normal control mode) | ID0 |
| ... | ... | ... | ... | ... |

Embodiment 2

In embodiment 2, the time information may be a time stamp and the position information may comprise at least two viewing coordinates. Accordingly, step S14 may record the information shown in table 3 below. Since a video is usually displayed in a rectangular screen, the range of the field of view can be obtained by recording an upper left viewing coordinate and a lower right viewing coordinate. If the range of the field of view is displayed in a non-rectangular screen, the invention may record a plurality of apex coordinates or record a center coordinate and a radius according to geometrical pattern of the non-rectangular screen, so as to define the range of the field of view. Furthermore, the viewing coordinates may be screen pixel coordinates or viewing angle coordinates. When recording the screen pixel coordinate, it needs to inform the user about pixel size of base map corresponding to the screen pixel coordinate. When recording the viewing angle coordinate, it needs to inform the user about horizontal angle range and vertical angle range covered by the monitored area 3. Compared to the recording format shown in table 2, the recording format shown in FIG. 3 can reduce data amount substantially.

TABLE 3

| Time stamp | Upper left viewing coordinate | Lower right viewing coordinate | Sampling manner | Operating mode | Operating person |
| --- | --- | --- | --- | --- | --- |
| Oct. 25, 2016 13:15:22 | (X1, Y1) | (X2, Y2) | 0 (Polling sample) | 0 (Normal control mode) | ID1 |
| ... | ... | ... | ... | ... | ... |

Embodiment 3

In embodiment 3, the time information may be a time stamp and the position information may comprise a viewing center coordinate and a viewing size. Accordingly, step S14 may record the information shown in table 4 below. Since the range of the monitored area 3 is definitely larger than the range of one single field of view, the invention may replace one viewing coordinate with the viewing size, so as to further reduce data amount.

TABLE 4

| Time stamp | Viewing center coordinate | Viewing size | Sampling manner | Operating mode | Operating person |
| --- | --- | --- | --- | --- | --- |
| Oct. 25, 2016 13:15:24 | (Xc, Yc) | Width × Height | 1 (Stable sample) | 0 (Normal control mode) | ID3 |
| ... | ... | ... | ... | ... | ... |

Embodiment 4

In step S12, when sampling each of the field of view, the method of the invention may generate an approximate circle corresponding to each of the field of view, wherein the approximate circle may be a circumscribed circle or an inscribed circle. Therefore, in embodiment 4, the time information may be a time stamp and the position information may comprise a viewing center coordinate and a diameter or a radius of the approximate circle. Accordingly, step S14 may record the information shown in table 5 below.

TABLE 5

| Time stamp | Viewing center coordinate | Diameter of approximate circle | Sampling manner | Operating mode | Operating person |
|---|---|---|---|---|---|
| Oct. 25, 2016 13:15:26 | (Xc, Yc) | R | 1 (Stable sample) | 1 (Auto-tracking mode) | ID2 |
| ... | ... | ... | ... | ... | ... |

Embodiment 5

In embodiment 5, the time information may be a time range. Accordingly, step S14 may record the information shown in table 6 below.

TABLE 6

| Time range | Viewing center coordinate (Xc, Yc) | Viewing size (Width × Height) | Sampling manner | Operating mode | Operating person |
|---|---|---|---|---|---|
| Oct. 25, 2016 13:15:22 to Oct. 25, 2016 13:15:24 | (5, 6) | 9 × 7 | 0 (Polling sample) | 0 (Normal control mode) | ID0 |
| ... | ... | ... | ... | ... | ... |

In step S12, the invention may sample a plurality of current field of views of the camera 1 within a second time interval according to the first time interval. Then, the invention may merge a plurality of time information and a plurality of position information of the current field of views, wherein the first time interval is shorter than the second time interval. For example, the invention may sample the field of view once every 0.5 second (i.e. the first time interval) and merge the sampled data within 2 seconds (i.e. the second time interval) to form an updated data. Accordingly, the time range of the updated data may be 2016/10/25/13:15:22 to 2016/10/25/13:15:24. The aforesaid first time interval and second time interval may be set by the user.

Figure 4:
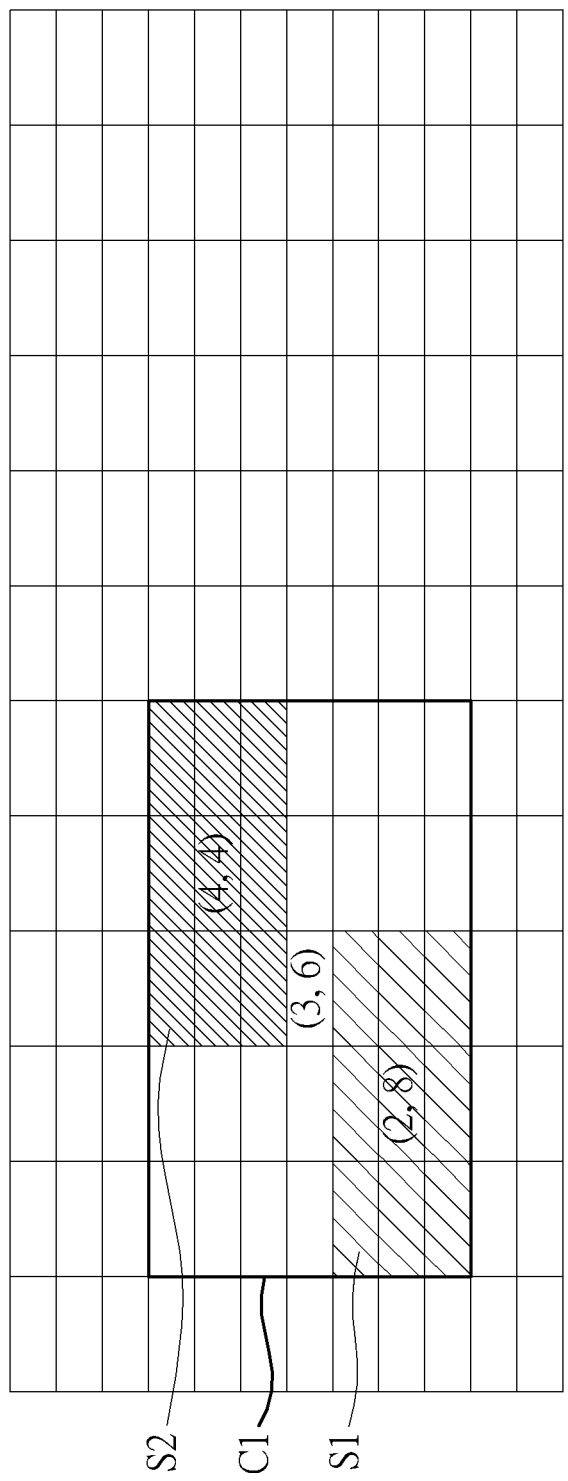
FIG. 4 is a schematic diagram illustrating a field of view and another field of view merged and updated to form another field of view.
Figure 5:
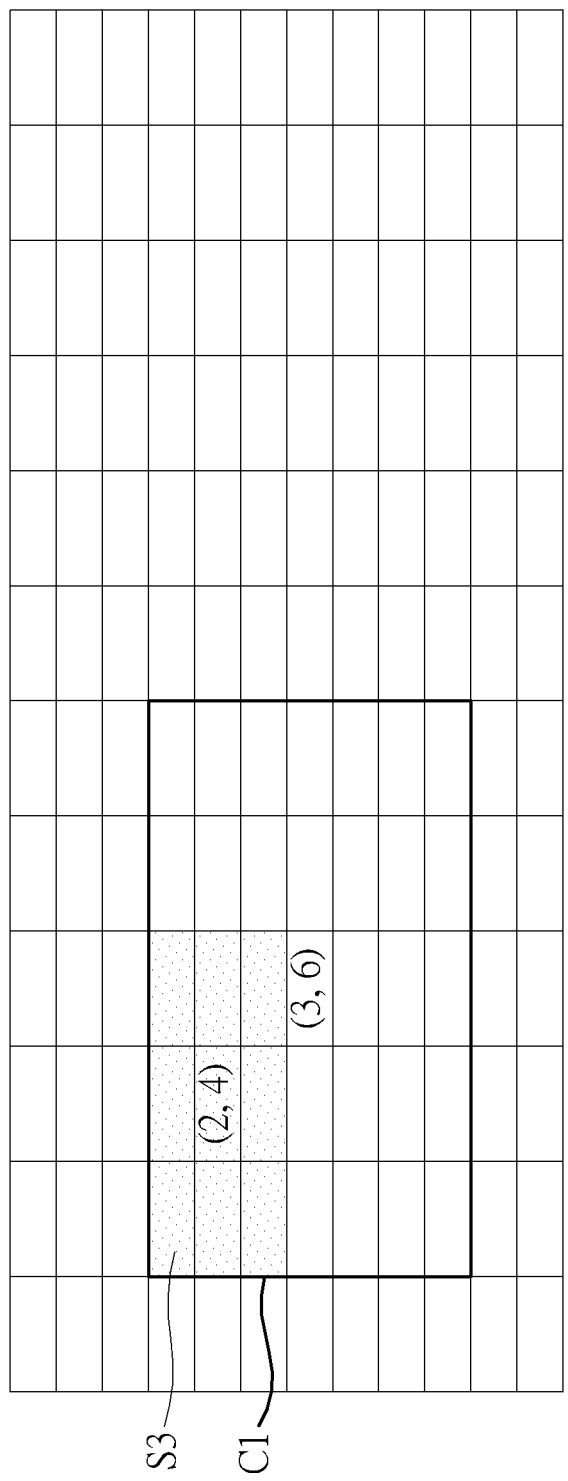
FIG. 5 is a schematic diagram illustrating a field of view located within another field of view.
Figure 6:
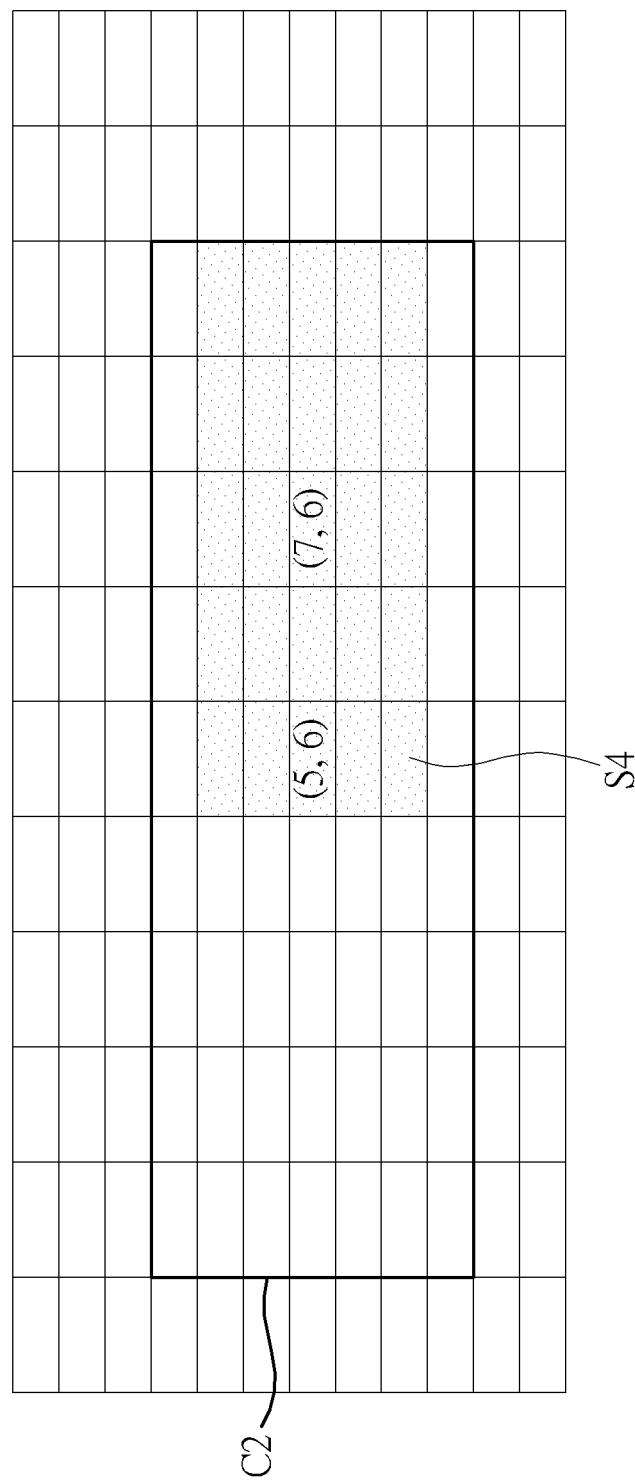
FIG. 6 is a schematic diagram illustrating a field of view and the field of view shown in FIG. 5 merged and updated to form another field of view.

Referring to FIGS. 4 to 6, FIG. 4 is a schematic diagram illustrating a field of view S1 and a field of view S2 merged and updated to form a field of view C1, FIG. 5 is a schematic diagram illustrating a field of view S3 located within the field of view C1, and FIG. 6 is a schematic diagram illustrating a field of view S4 and the field of view C1 shown in FIG. 5 merged and updated to form a field of view C2. The center coordinates and sizes of the field of views S1-S4, C1-C2 are shown in table 7 below.

TABLE 7

| Field of view | Center coordinate | Size |
|---|---|---|
| S1 | (2, 8) | 3 × 3 |
| S2 | (4, 4) | 3 × 3 |
| S3 | (2, 4) | 3 × 3 |
| S4 | (7, 6) | 5 × 5 |
| C1 | (3, 6) | 5 × 7 |
| C2 | (5, 6) | 9 × 7 |

It is assumed that the field of view S1 is sampled at 0.5 second, the field of view S2 is sampled at 1 second, the field of view S3 is sampled at 1.5 seconds, the field of view S4 is sampled at 2 seconds, and the time range of recording is 2 seconds. After sampling the field of views S1, S2, the invention merges and updates the field of views S1, S2 to form the field of view C1, as shown in FIG. 4. Then, after sampling the field of view S3, the invention needs not to update the data of the field of view C1 since the field of view S3 is located within the field of view C1. Then, after sampling the field of view S4, the invention merges and updates the field of view S4 and the field of view C1 to form the field of view C2 since the field of view S4 is located beyond the field of view C1. Then, the invention records the data of the field of view C2 (as shown in table 6) and samples the field of view for next time range.

Furthermore, when the operating mode or the operating person is changed during the process of sampling the field of view, the invention will add a record correspondingly. For example, if the time range of recording is 2 seconds and the operating mode is changed at 1.5 seconds, the previous time range of recording will be 1.5 seconds rather than 2 seconds.

When the recording table comprises a field of sampling manner, the invention may record an individual record for the stable sample. For example, if the time range of recording is 2 seconds and the stable sample is triggered at 1.5 seconds, the invention will add a record for the stable sample. Accordingly, the previous time range of recording for the polling sample will be 1.5 seconds, as shown in table 8 below.

TABLE 8

| Time range | Viewing center coordinate (Xc, Yc) | Viewing size (Width × Height) | Sampling manner |
|---|---|---|---|
| Oct. 25, 2016 13:15:22 to Oct. 25, 2016 13:15:23.5 | (5, 6) | 9 × 7 | 0 (Polling sample) |
| Oct. 25, 2016 13:15:23.5 to Oct. 25, 2016 13:15:23.5 | (7, 6) | 5 × 5 | 1 (Stable sample) |
| Oct. 25, 2016 13:15:23.5 to Oct. 25, 2016 13:15:25.5 | (5, 6) | 5 × 5 | 0 (Polling sample) |
| ... | ... | ... | ... |

If the recording table does not comprise the field of sampling manner, the invention may analyze and recognize that the sampling manner is polling sample or stable sample according to the time range and other fields (e.g. operating mode, operating person, and so on). As shown in table 9 below, table 9 records five data, wherein the first data is a polling sample data in 2 seconds, the second data is a polling sample data in 1 second, the third data is a newly added polling sample data in 1 second since the operating mode is changed from auto-tracking mode to normal control mode, the fourth data is a newly added stable sample data since the system detects that the user inputs a stop command, and the fifth data is a polling sample data in 2 seconds. Accordingly, when two conditions occur, the sampling manner can be recognized as stable sample, wherein the first condition is that the beginning time of the time range is identical to the ending time of the time range and the second condition is that the operating mode or other fields are identical to that/those of previous data.

TABLE 9

| Time range | Viewing center coordinate (Xc, Yc) | Viewing size (Width × Height) | Operating mode |
|---|---|---|---|
| Oct. 25, 2016 13:15:21 to Oct. 25, 2016 13:15:23 | (5, 6) | 9 × 7 | 1 (Auto-tracking mode) |
| Oct. 25, 2016 13:15:23 to Oct. 25, 2016 13:15:24 | (5, 6) | 9 × 7 | 1 (Auto-tracking mode) |
| Oct. 25, 2016 13:15:24 to Oct. 25, 2016 13:15:25 | (6, 6) | 5 × 5 | 0 (Normal control mode) |
| Oct. 25, 2016 13:15:25 to Oct. 25, 2016 13:15:25 | (6, 6) | 3 × 3 | 0 (Normal control mode) |
| Oct. 25, 2016 13:15:25 to Oct. 25, 2016 13:15:27 | (6, 6) | 3 × 3 | 1 (Auto-tracking mode) |
| . . . | . . . | . . . | . . . |

It should be noted that if no other fields can be used to recognize that the sampling manner is polling sample or stable sample (as shown in table 10 below), the sampling manner can be recognized as stable sample when the beginning time of the time range is identical to the ending time of the time range, e.g. the third data in table 10 below.

TABLE 10

| Time range | Viewing center coordinate (Xc, Yc) | Viewing size (Width × Height) |
|---|---|---|
| Oct. 25, 2016 13:15:21 to Oct. 25, 2016 13:15:23 | (5, 6) | 9 × 7 |
| Oct. 25, 2016 13:15:23 to Oct. 25, 2016 13:15:25 | (5, 6) | 9 × 7 |
| Oct. 25, 2016 13:15:25 to Oct. 25, 2016 13:15:25 | (6, 6) | 3 × 3 |
| Oct. 25, 2016 13:15:25 to Oct. 25, 2016 13:15:27 | (6, 6) | 3 × 3 |
| . . . | . . . | . . . |

As shown in table 11 below, the monitored area 3 may be defined as 5×5 grids and a field of view sampled by the merging manner of the aforesaid embodiment 5 may comprise twelve grids with corresponding grid coordinates (0,1), (1,1), (2,1), (4,1), (0,2), (1,2), (2,2), (4,2), (0,3), (1,3), (2,3), (4,3), wherein the numeral "0" following the grid coordinate represents that the grid is not located within the field of view and the numeral "1" following the grid coordinate represents that the grid is located within the field of view. In other words, the sampled field of view may consist of two non-continuous data regions.

TABLE 11

| | | | | |
|---|---|---|---|---|
| (0, 0):0 | (1, 0):0 | (2, 0):0 | (3, 0):0 | (4, 0):0 |
| (0, 1):1 | (1, 1):1 | (2, 1):1 | (3, 1):0 | (4, 1):1 |
| (0, 2):1 | (1, 2):1 | (2, 2):1 | (3, 2):0 | (4, 2):1 |
| (0, 3):1 | (1, 3):1 | (2, 3):1 | (3, 3):0 | (4, 3):1 |
| (0, 4):0 | (1, 4):0 | (2, 4):0 | (3, 4):0 | (4, 4):0 |

Therefore, according to the aforesaid embodiments, the invention may record the information in tables 12 to 14 below.

TABLE 12

| Time range | Upper left viewing coordinate (X1, Y1) | Lower right viewing coordinate (X2, Y2) |
|---|---|---|
| Oct. 25, 2016 13:15:21 to Oct. 25, 2016 13:15:23 | (0, 1) | (4, 3) |

TABLE 13

| Time range | Viewing center coordinate (Xc, Yc) | Viewing size (Width × Height) |
|---|---|---|
| Oct. 25, 2016 13:15:21 to Oct. 25, 2016 13:15:23 | (2, 2) | 5 × 3 |

TABLE 14

| Time range | Grid coordinate |
|---|---|
| Oct. 25, 2016 13:15:21 to Oct. 25, 2016 13:15:23 | 0000011101111011110100000 |

Furthermore, the grid coordinate shown in table 14 may be compressed by run length encoding (RLE) to form a format shown in table 15 below. It should be noted that, in addition to RLE, the invention may compress the grid coordinate by a compression algorithm.

TABLE 15

| Time range | Grid coordinate |
|---|---|
| Oct. 25, 2016 13:15:21 to Oct. 25, 2016 13:15:23 | N5Y3N1Y4N1Y4N1Y1N5 |

After recording the time information and the position information of the sampled field of views according to the aforesaid embodiments, the invention can generate a monitoring strength distribution corresponding to the monitored area 3 according to the time information and the position information. The monitoring strength distribution may be generated by two manners depicted in the following.

The first manner is to accumulate a stay time of each of the position information and generate the monitoring strength distribution corresponding to the monitored area 3 according to the stay time of each of the position information, wherein the stay time represents a total time accumulated for each of the position information appearing in the field of view. In other words, the longer the stay time of a field of view is, the more often the field of view is monitored.

The second manner is to accumulate a number of recording times of each of the position information and generate the monitoring strength distribution corresponding to the monitored area 3 according to the number of recording times of each of the position information. In other words, the more the number of recording times of a field of view is, the more often the field of view is monitored.

The invention may allow the user to use different conditions (e.g. sampling manner, operating mode, operating person, stay time, the number of recording times, etc.) to lookup the monitoring strength distribution of the monitored area 3. In practical applications, the invention may render the monitoring strength distribution of the monitored area 3 by heat map, pie chart, coordinate distribution chart, histogram or other charts according to the stay time or the number of recording times of the position information. For the heat map, the invention may generate the heat map of the monitoring strength distribution on a planar or fisheye panorama of the monitored area 3 for the user to view the monitoring strength distribution of the monitored area 3. It should be noted that the method for generating the heat map is well known by one skilled in the art, so it will not be depicted herein.

As mentioned in the above, when driving the image capturing module of the camera to monitor the monitored area, the invention samples a plurality of field of views to obtain a plurality of time information and a plurality of position information. Then, the invention generates the monitoring strength distribution corresponding to the monitored area according to the time information and the position information. A user can obtain information including coverage, hot zone, dead spot, and so on related to the monitored area through the monitoring strength distribution corresponding to the monitored area, so as to know well the monitored condition of the monitored area.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An image analyzing method applied to a camera, the camera being configured to monitor a monitored area, the image analyzing method comprising steps of:
   driving the camera to monitor the monitored area;
   sampling a plurality of field of views of the camera with a first time interval when the camera monitors the monitored area, so as to obtain a plurality of time information and a plurality of position information corresponding to the field of views, wherein each of the time information is corresponding to one of the position information;
   sampling a plurality of current field of views of the camera within a second time interval according to the first time interval, wherein the first time interval is shorter than the second time interval;
   merging a plurality of time information and a plurality of position information of the current field of views;
   recording the time information and the position information; and
   generating a monitoring strength distribution corresponding to the monitored area according to the time information and the position information.

2. The image analyzing method of claim 1, wherein the step of sampling a plurality of field of views when the camera monitors the monitored area comprises step of:
   sampling a current field of view of the camera when the current field of view is motionless.

3. The image analyzing method of claim 1, wherein the step of recording the time information and the position information comprises step of:
   recording at least one of a sampling manner, an operating mode and an operating person corresponding to each of the field of view.

4. The image analyzing method of claim 1, wherein each of the position information comprises at least two viewing coordinates and the at least two viewing coordinates are screen pixel coordinates or viewing angle coordinates.

5. The image analyzing method of claim 1, wherein each of the position information comprises a viewing center coordinate and a viewing size, or wherein each of the position information comprises a grid coordinate.

6. The image analyzing method of claim 1, wherein the step of sampling a plurality of field of views when the camera monitors the monitored area comprises step of:
   generating an approximate circle corresponding to each of the field of view;
   wherein each of the position information comprises a viewing center coordinate and a diameter or a radius of the approximate circle.

7. The image analyzing method of claim 1, wherein the step of generating a monitoring strength distribution corresponding to the monitored area according to the time information and the position information comprises steps of:
   accumulating a stay time of each of the position information; and
   generating the monitoring strength distribution corresponding to the monitored area according to the stay time of each of the position information;
   wherein the stay time represents a total time accumulated for each of the position information appearing in the field of view.

8. The image analyzing method of claim 1, wherein the step of generating a monitoring strength distribution corresponding to the monitored area according to the time information and the position information comprises steps of:
   accumulating a number of recording times of each of the position information; and
   generating the monitoring strength distribution corresponding to the monitored area according to the number of recording times of each of the position information.

9. A camera configured to monitor a monitored area, the camera comprising:
   an image capturing module; and
   a processor electrically connected to the image capturing module, the processor driving the image capturing module to monitor the monitored area, the processor sampling a plurality of field of views of the camera with a first time interval when the image capturing module monitors the monitored area, so as to obtain a plurality of time information and a plurality of position information corresponding to the field of views, wherein each of the time information is corresponding to one of the position information, the processor sampling a plurality of current field of views of the camera within a second time interval according to the first time interval and merging a plurality of time information and a plurality of position information of the current field of views, the first time interval being shorter than the second time interval, the processor recording the time information and the position information, the processor generating a monitoring strength distribution corresponding to the monitored area according to the time information and the position information.

10. The camera of claim 9, wherein the processor samples a current field of view of the camera when the current field of view is motionless.

11. The camera of claim 9, wherein the processor records at least one of a sampling manner, an operating mode and an operating person corresponding to each of the field of view.

12. The camera of claim 9, wherein each of the position information comprises at least two viewing coordinates and the at least two viewing coordinates are screen pixel coordinates or viewing angle coordinates.

13. The camera of claim 9, wherein each of the position information comprises a viewing center coordinate and a viewing size, or wherein each of the position information comprises a grid coordinate.

14. The camera of claim 9, wherein the processor generates an approximate circle corresponding to each of the field of view, each of the position information comprises a viewing center coordinate and a diameter or a radius of the approximate circle.

15. The camera of claim 9, wherein the processor accumulates a stay time of each of the position information and generates the monitoring strength distribution corresponding to the monitored area according to the stay time of each of the position information, the stay time represents a total time accumulated for each of the position information appearing in the field of view.

16. The camera of claim 9, wherein the processor accumulates a number of recording times of each of the position information and generates the monitoring strength distribution corresponding to the monitored area according to the number of recording times of each of the position information.

* * * * *